C. G. SCHMIDT.
HOSE NOZZLE.
APPLICATION FILED AUG. 11, 1914.
1,191,621.
Patented July 18, 1916.
2 SHEETS—SHEET 1.
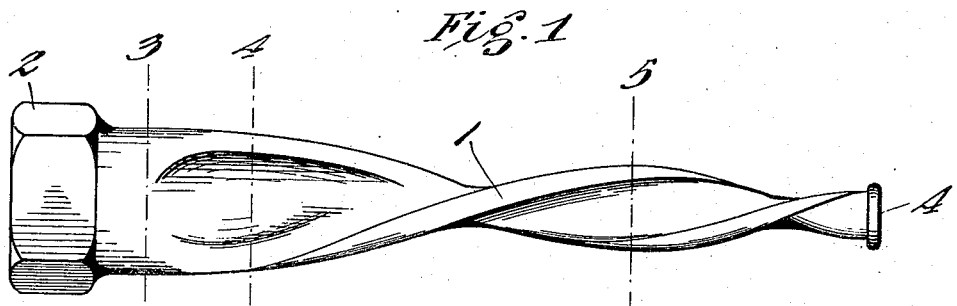
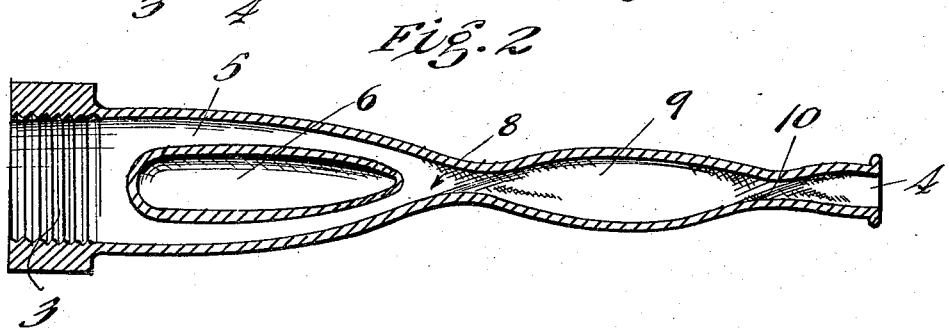
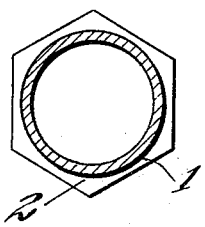 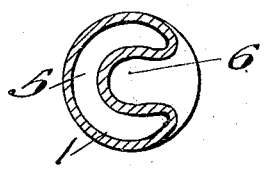  
Witnesses
Inventor
Charles G. Schmidt
By Herman A. Phieffr
Attorney C. G. SCHMIDT.
HOSE NOZZLE.
APPLICATION FILED AUG. 11, 1914.
1,191,621.
Patented July 18, 1916.
2 SHEETS—SHEET 2.
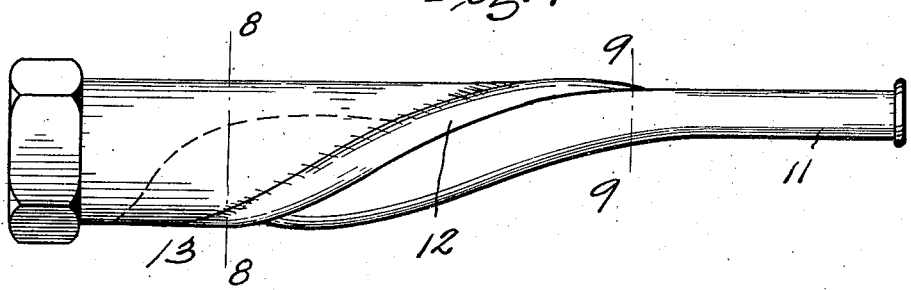
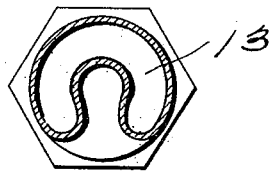
Inventor
Charles G. Schmidt
By Herman A. Phillips
Attorney
Witnesses
Sidney V. Negrotto
C. K. Davies

UNITED STATES PATENT OFFICE.

CHARLES G. SCHMIDT, OF ST. JACOB, ILLINOIS.

HOSE-NOZZLE.

1,191,621.  Specification of Letters Patent.  Patented July 18, 1916.

Application filed August 11, 1914. Serial No. 856,279.

*To all whom it may concern:*

Be it known that I, CHARLES G. SCHMIDT, a citizen of the United States of America, residing at St. Jacob, in the county of Madison and State of Illinois, have invented certain new and useful Improvements in Hose-Nozzles, of which the following is a specification.

The present invention relates to improvements in hose nozzles, and the invention consists essentially in the peculiar arrangement of the nozzle whereby a twisting motion is given to the current of water as it emerges from the nozzle.

In the accompanying drawings I have illustrated one complete example of the physical embodiment of my invention constructed according to the best mode I have so far devised for the practical application of the principles of the invention.

Figure 1 is a side elevation of a hose nozzle constructed according to the principles of my invention. Fig. 2 is a longitudinal vertical central sectional view of the nozzle of Fig. 1. Fig. 3 is a transverse section on line 3—3, Fig. 1. Fig. 4 is a transverse section on line 4—4, Fig. 1. Fig. 5 is a transverse section on line 5—5, Fig. 1. Fig. 6 is an end view of the distal end of the nozzle. Fig. 7 is a side elevation of a modified form of the invention. Fig. 8 is a section of Fig. 7 on line 8—8. Fig. 9 is a sectional view on line 9—9 of Fig. 7.

In the preferred embodiment of my invention, as illustrated in the drawings, I have shown an integral hose nozzle which is represented as a whole by the numeral 1, and this nozzle at its proximate end is provided with the usual nut portion 2 which is interiorly threaded at 3 to form a barrel for attachment to the threaded sleeve on the hose (not shown). At this proximate end of the nozzle, as shown in Fig. 3, the barrel of the nozzle is cylindrical, but between this point and the distal end or mouth 4 of the nozzle, the body of the nozzle is twisted and its diameter is reduced, so that a spiral formation of the nozzle is accomplished.

At line 4—4, in Fig. 1, it will be seen that the interior of the nozzle is U-shape in cross section, as indicated at 5 in Fig. 4. This formation is accomplished by providing a recess 6 in the wall of the material and the wall is depressed to make this U-shaped formation and the U-shaped formation converges the water to the transversely flat portion of the nozzle. From dotted line 4—4 to dotted line 5—5, the twist makes a half turn, and the barrel in cross section is elliptical in formation as at 7 (Fig. 5). From the point of line 5—5 to the distal end or mouth 4 of the nozzle a second half turn is made, so that it will be seen that proximately from line 4—4 to the end of the nozzle, one complete turn is made in the spirally arranged flat nozzle.

In Fig. 2 it will be seen that the water passing through the proximate end of the nozzle will flow around the wall which forms recess 6, through the U-shaped portion 5, and then at the point 8 a whirling or twisting motion is given to the water and it travels in a "flat" horizontal position at this point. As the water passes through the portion 9 of the nozzle, the stream retains its shape, but the "flat" part of the stream stands vertically. Again at the point 10, the stream is turned to a horizontal position, and finally as it emerges from the mouth 4 the stream stands in a vertical position. Thus, as the stream of water flows through the nozzle under suitable pressure a spiral or whirling motion is given to the stream.

It will, of course, be understood that the nozzles may be made in different sizes to suit conditions, and be made of suitable material, and, as illustrated in the drawing, it will be apparent that I have provided an integral nozzle which will accomplish the purposes set forth as the object of my invention.

In the modified form of the invention, illustrated in Figs. 7, 8 and 9, I have shown a nozzle having its distal end 11 offset from the center of the proximate end of the nozzle. The elliptical end portion 11 is formed at the end of a one half twist shown at 12, and it will be seen in Fig. 7, that the twist in the nozzle extends from the lower or under side of the nozzle to its upper side, being a one-half turn or twist. The U-shaped formation of the nozzle is preserved at 13, and the form of the nozzle end 11 is shown clearly in Fig. 9. This modification of the invention is preferable in many cases, and the one half turn or twist of the nozzle suffices to produce the desired result.

Having thus fully described my invention, what I claim as new and desire to secure by Letters Patent, is:

A tapering hose nozzle having a round threaded barrel and attaching nut, a portion U-shaped in cross section adjoining the round portion, and a spirally arranged flat portion bodily twisted between said U-shaped portion and the distal end of the nozzle.

In testimony whereof I affix my signature in presence of two witnesses.

CHARLES G. SCHMIDT.

Witnesses:
EMIL WASEM,
DANIEL WIDICUS.

Copies of this patent may be obtained for five cents each, by addressing the "Commissioner of Patents, Washington, D. C."